United States Patent
Foote et al.

(10) Patent No.: US 7,624,166 B2
(45) Date of Patent: Nov. 24, 2009

(54) SYSTEM AND METHODS FOR REMOTE CONTROL OF MULTIPLE DISPLAY AND DEVICES

(75) Inventors: Jonathan T. Foote, Menlo Park, CA (US); Qiong Liu, Milpitas, CA (US); Matthew Cooper, San Francisco, CA (US); John Boreczky, San Leandro, CA (US)

(73) Assignee: Fuji Xerox Co., Ltd. (JP)

( * ) Notice: Subject to any disclaimer, the term of this patent is extended or adjusted under 35 U.S.C. 154(b) by 1169 days.

(21) Appl. No.: 10/727,310

(22) Filed: Dec. 2, 2003

(65) Prior Publication Data

US 2005/0117910 A1    Jun. 2, 2005

(51) Int. Cl.
*G06F 15/16* (2006.01)
(52) U.S. Cl. ........................... 709/223; 463/47
(58) Field of Classification Search .............. 709/223; 463/53, 57; 356/5.02, 19, 490, 568
See application file for complete search history.

(56) References Cited

U.S. PATENT DOCUMENTS

| 4,855,746 | A |   | 8/1989 | Stacy | 341/176 |
| 4,959,810 | A |   | 9/1990 | Darbee et al. | 364/900 |
| 5,898,397 | A |   | 4/1999 | Murray | 341/176 |
| 6,020,829 | A | * | 2/2000 | Hormann | 340/825.69 |
| 2002/0000971 | A1 | * | 1/2002 | Armstrong | 345/156 |
| 2002/0049978 | A1 | * | 4/2002 | Rodriguez et al. | 725/86 |

OTHER PUBLICATIONS

Kohtake et al., "InfoPoint: A Device that Provides a Uniform User Interface to Allow Appliances to Work Together over a Network", Jan. 2001 Personal and Ubiquitous Computing, vol. 5 Issue 4 Publisher: Springer-Verlag.*
Kohtake et al, "InfoStick: An Interaction Device for Inter-Appliance Computing", Sep. 1999 HUC '99: Proceedings of the 1st international symposium on Handheld and Ubiquitous Computing Publisher: Springer-Verlag.*
S. Uchihashi, J. Foote, A. Girgensohn, and J. Boreczky. "Video Magna: Generating Semantically Meaningful Video Summaries." In Proc. ACM Multimedia, (Orlando, Fl) ACM Press, pp. 383-392, 1999.
Qiong Liu, Jon Foote, Lynn Wilcox, Matt Cooper, Don Kimber, and John Boreczky. "General Pointer: A Summary Document." FXPAL Technical Memo TM-01-012, (Aug. 2001).
Jonathan Foote. "System for awareness of remote users of a wall display," FXPAL Technical Memo TM-01-003, (Apr. 2001).
Jonathan Foote. "Put It There: Intuitive control of multimedia equipment," FXPAL Technical Memo TM-00-004 (Sep. 2000).
Intersense Incorporated, "IS-600 Mark 2 Precision Motion Tracker" Http://www.isense.com/products/prec/is600/index.htm.

(Continued)

*Primary Examiner*—Vivek Srivastava
*Assistant Examiner*—William J Goodchild
(74) *Attorney, Agent, or Firm*—Fliesler Meyer LLP (57) ABSTRACT

Methods and systems for transferring media between media source devices and media sink devices are disclosed. Remote control units are used to indicate the media sink and media source devices for transferring media data between these elements.

20 Claims, 3 Drawing Sheets

OTHER PUBLICATIONS

Polhemus Incorporated, "ISOTRAK II" http://www.polhemus.com/isotrkds.htm.

A. Fox, B. Johnson, P. Hanrahan, and T. Winograd. "Integrating Information Appliances into an (Interactive Workspace." In IEEE Computer Graphics and Applications, pp. 54-65, May 2000.

J. Rekimoto. "A multiple Device Approach for Supporting Whiteboard-based Interactions", In ACM Conference on Human Factors in System, (CHI 1998).

N. Khotake, J. Rekimoto and Y. Anzai, "InfoStick" an interaction device for Inter-Appliance computing, In Workshop on Handheld and Ubiquitous Computing (HUC'99), 1999.

S. Wray, T. Glauert, and A. Hopper. The Medusa Applications Environment. Proc. ACM Multimedia, pp. 265-273, 1994.

T. Hodes, R. Katz, E. Servan-Schreiber, and L. Rowe. "Composable Ad-hoc Mobile Services for Universal Interatction"; computer Science Division, University of California at Berkeley; Aug. 2, 1997; 12 pages.

T. Hodes, M. Newman, S. McCanne, R.H. Katz, J. Landay. "Shared Remote Control of a Video conferencesing Application: Motivation, Design and Implementation." SPIE Multimedia Computing and Networking (MMCN'99), Jan. 1999, pp. 17-28.

T. Starner, J. Auxier, D. Ashbrook, M. Gandy. "The Gesture Pendant: A Self-illuminating, Wearable, Infrared Computer Version System for Home Automation Control and Medical Monitoring." In Proceedings of IEEE International Symposium of Wearable Computing (ISWC 2000). Atlanta, Ga. Oct. 2000. Http://www.guv.gatech.edu/ccg/publications/gesture_pendant.pdf.

N.A. Streitz, et al. "i-Land: An interactive Landscape for Creativity and Innovations." In ACM Conference on Human Factors in Computing Systems (CHI'99), Pittsburgh, Pennsylvania, U.S.A., May 15-20, 1999. ACM Press, New York, pp. 120-127. Http://www.darmstadt.gmd.de/ambiente/paper/chi99Repring.pdf.

J. Geiβler. "Shuffle, throw and take it! Working efficiently with an interactive wall" In geisslerCHI98 Summary, pp. 265-266 ftp://ftp.darmstadt.gmd.de/pub/ambiente/CHI98/geisslerCHI98.ps.

J.R. Cooperstock, S.S. Fels, W. Buxton, and K.C. Smith. "Reactive environments: Throwing away your keyboard and mouse" In Communications of the ACM, 40(7)pp. 65-73, Sep. 1997. http://citeseer.nj.nec.com/cooperstock97reactive.html, also http://www.dgp.toronto.edu/people/rroom/research/papers/cacm.html.

Brumitt, B.L., Meyer, B., Krumm, J., Kern, A., Shafer, S. "EasyLiving: Techonolgies for Intelligent Environments" In Proc. 2nd Intl. Symposium on Handheld and Ubiquitous Computing, Sep. 2000, pp. 12-27. Http://research.microsoft.com/~jckrumm/Publication/huc2K-final.pdf.

* cited by examiner

SYSTEM AND METHODS FOR REMOTE CONTROL OF MULTIPLE DISPLAY AND DEVICES

FIELD OF THE INVENTION

The present invention relates to the control of display equipment.

BACKGROUND

Remote control devices are often used for controlling electronic equipment such as computers, video cameras, Digital Video Disks (DVDs), video tapes, cable broadcast audio and video, video projectors, front panel displays, front and back room speakers, user laptops, Personal Digital Assistants (PDAs), or other personal display devices. Typically, each electronic device has its own remote control.

Programmable Universal remote controls have been designed to control multiple electronic devices. Programmable universal remote controls typically do not allow the electronic devices to interoperate.

SUMMARY

Embodiments of the present invention comprise ways of routing media data and controlling media equipment with a handheld controller.

In one embodiment of the present invention, a select signal is transmitted to a first control device associated with a source device using a remote control. A paste signal is transmitted to a second control device associated with a sink device using the remote control. In response to the transmitting, media data is transferred from the source device to the sink device.

One embodiment of the present invention is a system including a remote control. Control devices are associated with source devices and sink devices adapted to receive select and paste signals from the remote control. The system includes logic adapted to transfer media data from one of the source devices to one of the sink devices in response to the select and paste signals.

In one embodiment of the present invention, a handheld controller is pointed at a source device to select media data. The handheld controller is adapted to produce controller position and orientation information sufficient to determine the source device. The handheld controller can be pointed at a sink device to paste the media data. The handheld controller is adapted to produce controller position and orientation information sufficient to determine the sink device. In response to the selecting and pasting, the media data is transferred from the source device to the sink device.

One embodiment of the present invention is a system including a handheld controller to produce controller position and orientation information for selecting source and sink devices; and logic to transfer media data from a selected source device to a selected sink device in response to the selecting of the source and sink device with the handheld computer.

DETAILED DESCRIPTION

One embodiment of the present invention is an intuitive way to route media streams and control media equipment using a directional handheld controller. In one embodiment, the handheld controller is used to move media files between a source device and a sink device.

A source device is any device that can generate media data. Media data includes video, audio still images, a sequence of still images, presentation media such as PowerPoint®, scanned or digital documents, a sequence of mouse movements and/or keystrokes, digital "ink" from a pen-based computer or electronic whiteboard, steaming internet media, or web pages or a sequence thereof. In one embodiment, the media data is a media stream. Possible source devices include a Video Cassette Recorder (VCR) or DVD player, broadcast, satellite, or other audio/video receivers; streaming internet media decoders; fax or document scanners or digital cameras; PDAs or electronic whiteboards; computer systems running PowerPoint®, web browsers, internet meeting applications video cameras, microphones, or telephones in locations such as a remote conference room. A "null source" can be used to blank displays and to mute audio loudspeakers.

A sink device is any device that can receive, display, route, broadcast, print, or record a media stream. Examples of sink devices include video projectors, Cathode Ray Tubes (CRTs) or flat panel displays; laptop or PDA screens; amplified speakers, speakerphones or telephones (for audio streams); printers or fax machines; video recorders; and computer systems running any number of programs, for example internet meeting applications, electronic whiteboard displays, broadcast or CCTV transmission or streaming media encoders for internet transmission.

In one embodiment, a user connects a source to a sink device by means of a handheld controller. Source and sink devices can have one or more associated control devices. The user points the handheld controller directly at the indicated control device to control it. In one embodiment, a directional controller ensures that only one device receives a control command at any one time. In one embodiment, a media data from a source device is selected then transferred to an indicated sink device. The "cut" and "copy" functions are both examples of the select function. In one example, a "select" button is pressed while pointing at the control device associated with a source. A user can then point at the destination control device and by pressing the "paste" button direct the media data to that destination. For example, to move an image across multiple displays in a conference room, the user could point at the front display and press the "select" button. Pointing at a side display and pressing the "paste" button can cause the image to be displayed on the side display as well. The front display can then be used to other purposes, for example displaying the next image in a presentation. The same source can be "pasted" to additional devices, so that copies of the stream can be routed elsewhere, for example a display in a remote location for teleconferencing. An optional "blank" button serves to blank unused screens (and/or mute the associated audio) by "pasting" the null source. The "select" function can be a "cut" function that includes a "blank" function. These functions give the user sophisticated switching and routing control using intuitive point-and-click operations.

Figure 1A:
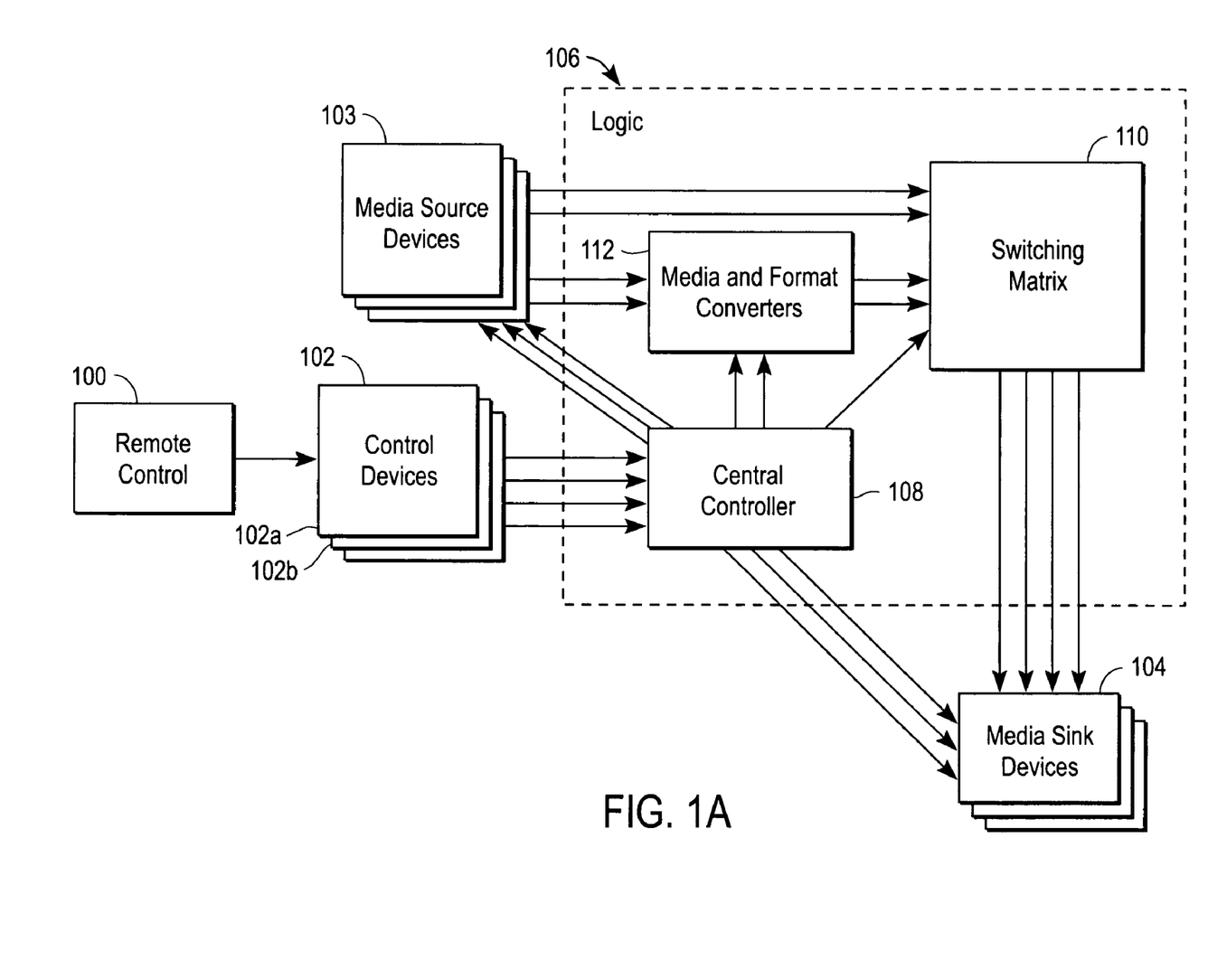
FIG. 1A is a diagram that illustrates a network system in one embodiment of the present invention.

FIG. 1A illustrates one embodiment of the system of the present invention. In this embodiment, remote control 100 can be used to point to a control device 102a associated with a media source device 103. Later the remote control 100 can be pointed to a control device 102b associated with a media sink device 104. In one embodiment, the remote control 100 transmits a select signal to a first control device associated with a source device. The select signal can be a coded signal that indicates to the control device that media data from the associated media source is selected. A paste signal can be transmitted to a control device such as a control device 102b associated with a media sink device.

In response to the transmitting of the select and paste signals, a media file can be transferred between the source device associated with the first control device and the sink device associated with the second control device. The control device associated with a source or sink device can be located near the source or sink device. Alternately, the control device can be embedded within the source sink device. In one embodiment, the remote control wirelessly transmits signals to the control device. The wireless device can be a directional device such as an infrared (IR) remote control.

In one embodiment, logic 106 is used to transfer media file from one of the source devices 103 to one of the media sink devices 104 in response to the selected paste signals sent to the control devices 102.

In one embodiment, the logic 106 includes a central controller 108. The central controller receives indications from the control devices 102 that the control devices have received a select signal from the remote control 100. The central computer control 108 can buffer each media data selection from a source device until a sink device is selected using the remote control 100. Once the sink device is selected, the central control 108 can check to determine whether the media data is compatible with the destination sink device. If not, the central controller 108 can check whether the media data can be converted into a format that is compatible with the destination sink device. The source device can be controlled by the central controller 108 to output the media data. The central controller can be a computer, dedicated processor or other device. This media data can be sent to a switching element, such as a switching matrix 110 which directs the media data to the destination sink device. In some cases, the media data can be sent to the media and format converters 112 before being sent to the switching matrix. The media and format converters 112 can convert at least some formats media data to a format compatible with the destination sink device. For example, a video signal can be converted to an audio signal for playing over speakers. In one embodiment, the central controller 108 send media data to the media and format converter 112 to convert the format. The switching matrix 110 can be any type of switch including full or partial interconnects. The central control 108 can store multiple selected media data and source IDS in a select buffer. The media data can be buffered on a stack, such as a First-in First-out (FIFO) or Last-in First-out (LIFO) stack until the media data is pasted to a sink device.

The switching matrix 110 can be configured by the central control 108 to send the media data to the correct destination from the correct source device to the correct destination and sink device. If the source device and sink device are incompatible or not connectable, the user can be alerted by some feedback. The media and format converters 112 can be placed in any part of the network. The switching matrix 110 can be implemented as a matrix of smaller switches and need not allow all possible routing paths.

In one embodiment, the switching matrix can be the Internet or other network. The routing of the media data can be done over the network. The central controller in this case need not be centrally located. Logic for the device can connect with the network, such as the Internet to transfer the media data.

The system of one embodiment can support a number of powerful media routing and conversion operations.

Virtual and physical source: In addition to source buttons on the controller, isolated IR receivers can serve as sources for selection commands. If a device is physically present, for example a DVD player, an IR receiver can be attached to the device. Any "select" command directed at this device can store the associated source ID (in this example, the DVD). If the source is not physically present, for example a satellite dish, the control device can be placed on a wall or other convenient location, perhaps with a sign or icon indicating the name of type of the source, and/or a miniature monitor that displays the source media.

Virtual Sinks: If a sink device is not physically present in the room, it may still be controlled using an associated control device. Examples include a teleconferencing remote display at another location. Small or additional displays can be used to monitor the virtual sinks, allowing the user to see the media being sent to the remote location.

Media Buses: One class of source/sink is a "media bus." This is a "virtual pipe" or media connection through which any media stream can be routed. For example, a bus can be established between locations during a teleconference in such a way that any stream pasted to that bus would serve as a media source at the remote site, or could be displayed on a dedicated sink.

Web Virtual Sinks: A useful class of virtual sinks include a web servers that can push the indicated media. For example, video can be routed to a streaming media server that will broadcast the selected source over the Web. For slide or computer presentations, the virtual sink could push still images onto a given web page. This can allow, for example, a local participant with a wireless laptop or PDA to access each new image. Additionally, sink devices can include a streaming media converter or broadcast station so that media can be accessed from multiple remote locations. This functionality could similarly extend to conventional broadcast applications in a TV or radio studio.

Automatic Media Conversion: Not all sources and sinks are compatible, because of resolution, bandwidth, and other factors. Where possible, the server/switcher matrix can convert between formats. For example, still frames can be extracted from a video stream and pushed to low-bandwidth viewless clients. In an extreme example, a video stream can be "pasted" to a printer using automatic summarization system that extracts still images and composes them into a printable summary.

"Snapshot" mode: In some cases, it is desirable to capture, store and move only a still frame or image (as opposed to a time-based media stream). In this case, a separate control button would function similar to the "select" button, but in fact capture a still "snapshot" image. This might be particularly useful in a lecture using presentation graphics, as the currently displayed graphic could then be pasted to auxiliary displays, to user devices (such as laptops for further use or annotation), or to a printer or other image-based device. In some cases, the lecturer is not the only one with the ability to control the system; given specific controller codes, an audience member could "select" the current graphic and "paste" to their personal laptop. Given a handheld device with sufficient capability, such as a color screen, it can be possible to select a number of "snapshots" which could be represented as thumbnail images in scrolling display. To recall a desired snapshot, the user would select the desired thumbnail and paste it to any available sink.

Figure 2:
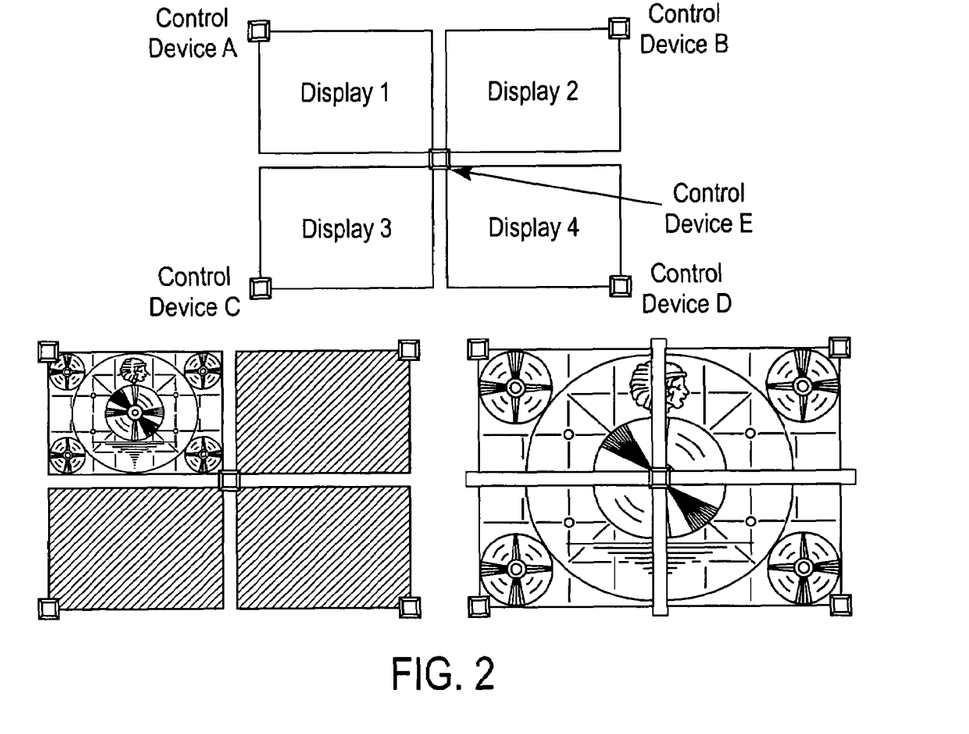
FIG. 2 is a diagram that illustrates the use of multiple control devices in a combined display.

Specific Device Control: Directional hand-held controllers allow specific devices to be controlled. Thus, device-specific commands such as play or rewind can be directed to specific devices just by pointing at their associated control device. This is an intuitive way to control multiple devices from one controller, as shown in FIG. 2. Here, five control devices are used to control four displays arranged as a "video wall." The control devices at the corners control each individual display: control device A controls display 1, and so forth. The central control device E controls all four displays as a unit, such that each display shows one quadrant of the source stream. Thus to paste a stream only to display 2 at the top left, the user would point the remote at control device B. For a larger display, the user would paste the source stream to the central control device E, which would result in that stream being shown on all four displays configured as one large display. Given the spatial controller described below, on controller would serve as a mouse pointer for multiple computer systems with multiple displays.

User Feedback: In one embodiment, the system gives users feedback on the operations in progress. Because the handheld controller is directional, immediate visual or other feedback on which device is being addressed can be provided. This can be done with visual or aural feedback, for example, by lighting a specific indicator lamp on the device being pointed at, or by generating a particular sound or vibrating the controller. It is also possible to "highlight" the selected system, for example by displaying the selected stream in reverse video or by using indicator lights on the selected control device, so that the user knows that stream will be used when the "paste" operation is selected. Other examples of "highlighted" sources might include adding a distinct border such as a red rectangle, changing the brightness or contrast of a selected image, or even changing the room lighting to highlight the selected device. Additional feedback can use miniature monitors to display a local or remote stream or device. This is useful for both sources (for example, a camera at a remote location can be represented with a control device having a small monitor that displays the camera image) and sinks (for example, a display at a remote location can be represented with a control device having a monitor that mirrors the remote display). Feedback on the controller itself may aid control operation, such as a laser pointer or tactile feedback that is activated when the controller is pointed at a control device, or an auxiliary display on the controller itself that might show, for example, an image representing the currently selected stream.

One implementation uses a controller such as an infrared (IR) controller similar to a familiar television remote control. Codes can be transmitted by the IR remote to one of the possible control devices, which contain IR receivers. Each source and sink has an associated ID and control device. Pressing or otherwise indicating the "select" function sends a "select" code to the control device being pointed at (which may indicate the selection condition by means of lights or other indicators.) This code instructs the system to save the ID for the source associated with the indicated control device. Multiple streams may be "selected" in a FIFO stack, such that the last stream selected is the first to be pasted. When pointing at the desired sink device and sending the "paste" code by releasing the "paste" button, the system connects the source (indicated by the stored ID) to the sink display (indicated by the pointed-at device). Thus, the signal is routed from one display to another by pointing and clicking. Devices that cannot serve as sinks for the selected stream can be made unresponsive to "paste" commands, or can indicate that condition by appropriated lights, sounds, or similar feedback. Other buttons generate codes that correspond to source IDs (for example the null source). When any particular sink receives a source ID code (as opposed to the "selection" code), the server knows to connect that source to that sink. Wireless control devices may be used with portable or moveable equipment such as PDAs, laptops or equipment on a dolly. In this case, the control device would communicate with the system via a wireless link, such as that used for laptop's wireless network connection.

Figure 3:
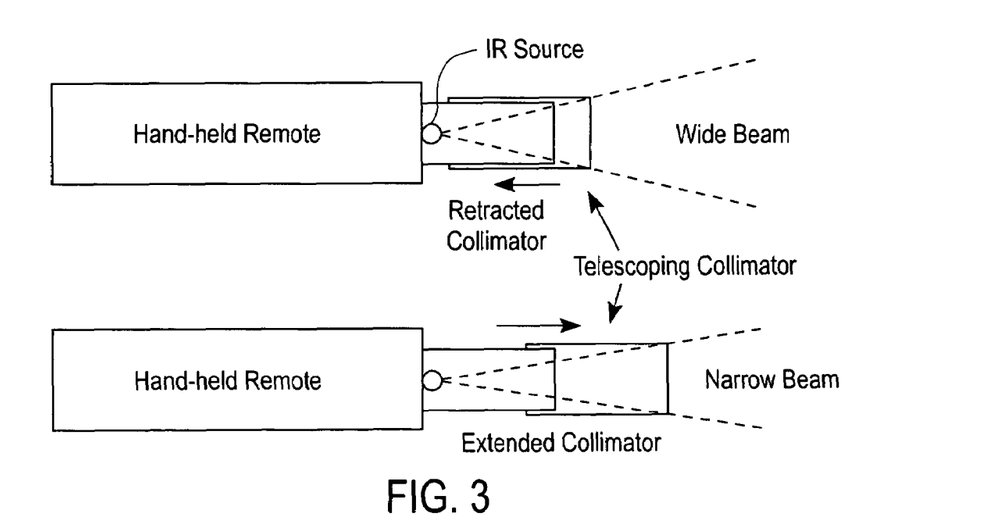
FIG. 3 is a diagram that shows an adjustable remote.

An important variable is the beam width of the controller. Too narrow a beam will mean that high precision will be needed when pointing the controller; while too wide a beam means that potentially more than one device may be selected. To control the beam width, a sliding collimator apparatus can be used as shown in FIG. 3. For user feedback, indicator lights associated with each display could be lit when the source form that display has been selected, so the user knows that the source ID is available for a paste. The IR controller can be configured to beep or vibrate when a control device is pointed at. Different sounds can be used to differentiate between operations such as cut and select. In the preferred embodiment, each control device has an indicator light that illuminates when selected. In operation, the user can select a command (such as "select" or select snapshot") by depressing a corresponding button the handheld controller. This would cause the controller to transmit a corresponding code via an IR LED. Any control device receiving any code can illuminate a "selection" light, however the command would not actually be operated upon until the user released the button. Thus, in a fashion similar to the familiar menu-selection mouse operation, the user can ensure that the desired device had been selected before issuing the command. It can be possible to blink the selection lights on multiple devices if they were inadvertently selected, to alert the user to that condition, or again to use a tactile or audible alert.

A visible laser pointer aligned with the IR beam can be used to assist the user in precisely indicating the desired receiver. Alternately, a visible light such as a bright LED can be aligned coincident with the IR element in the handheld controller. Thus, anything illuminated by the IR source would also be illuminated visible light, making the beam direction and extent visible to the user.

Figure 1B:
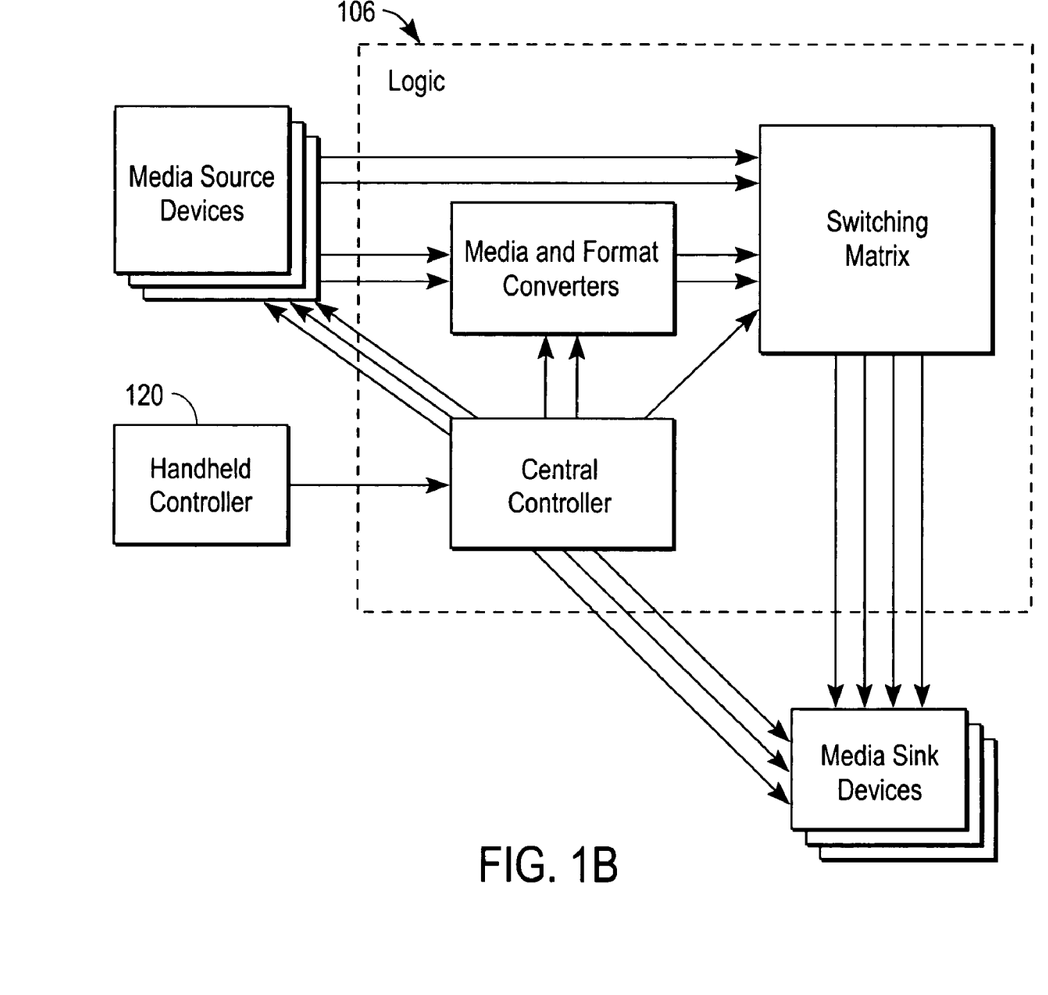
FIG. 1B is a diagram that illustrates a network embodiment of an alternate embodiment of the present invention.

FIG. 1B illustrates an alternate embodiment, in which the handheld control 120 produces a controller position and orientation information such that it can be determined what the handheld controller is pointing towards. The handheld controller 120 can interact with logic 106 to determine the device that the hand held controller is pointing at. The handheld controller can be a six-degree-of-freedom (6-DOF) pointer. In this embodiment, the six-degree-of-freedom pointer can be used to determine the direction that the handheld controller is pointing at and thus determine the media device indicated by the user.

The 6-DOF pointer can use a model of the spatial arrangements of media devices, typically in a room. A 6-DOF pointer is a device that estimates its spatial location and orientation, using triangulation or radio-frequency or other techniques. Examples of 6-DOF pointer systems are those made by InterSense and Polhemus. Alternatively, a 6-DOF sensor can be constructed by using two three-degree-of-freedom sensors attached to a rigid wand or rod. A wireless or other communication link can be used between the logic 106 and the 6-DOF controller 120. The controller can have sufficient angular resolution to indicate separate devices. Each source or sink device can be represented by a two- or three-dimensional region in space, which we will call a "control window." For example, an intuitive control window for a large display screen would be the rectangle of the screen. Giving the rectangle a small three-dimensional depth allows it to be indicated even when the controller is in the plane of the window. The system can detect when the controller is pointed at a particular control window by geometrically calculating whether the ray coincident with the controller intersects the region enclosed by the control window. Control windows may optionally be surrounded by a "tolerance region" such that pointing within the tolerance region would be equivalent to pointing at the control window. This would allow the user to select a given control window with less pointing accuracy. In the limit, the tolerance region can extend halfway to the nearest control window in any particular direction.

To connect a stream between source and sinks, the user points the spatial controller at the source control window, and the "select" command is indicated using a button or other command. This directs the system to store the ID associated with the indicated source stream in a "select buffer." Pointing the spatial controller at a sink control window and indicating the "paste" command directs the system to route the selected source to the indicated sink device. Tactile, audible, and/or visual feedback effects can be used to assist the user in selecting the desired command and device.

Control windows can be defined in advance, either manually or by using position sensors attached to the devices to be controlled. A straightforward application might allow users to define control windows using the spatial controller, for example by sweeping out a control window boundary while pressing a special controller button, and associating the new window with a device using a menu of similar selector. For the user, control windows may be indicated by the extent of the control device, by paint, markings or other visual indications, by an active projector, or by auditory or tactical feedback. As an example of the latter, the spatial controller can be configured to beep or vibrate when an active window is pointed at. Different sounds may indicate different conditions, for example an attempt to paste a stream to a device that does not support it (such as a source). Location-aware devices, for example a laptop computer equipped with a position sensor, can be associated with moveable control windows, such that when the device is moved the associated control window moves with it. In this case, the device may be controlled by pointing at it regardless of its location.

A 6-DOF controller enables a number of applications. For example, the controller can be used as a mouse or pen to control a displayed computer screen by manipulating windows and buttons, even across multiple computer and displays. The controller can easily be configured to act as a mouse or pointer for the display device it is closest to. Similarly, a spatial controller could allow a user to control equipment in another room "through" a video projection, given sufficient spatial information about the remote room and camera configuration.

By analyzing the location and position of the controller, the system can estimate the likely position of the user for video capture, or to display operator assistance, menus or other information using an active (steerable) projector. Additionally, the system can detect gestures made by moving the controller, and use these as additional commands. In one example, rotating the controller in a clockwise direction can direct the system to display the next slide in a presentation, while counter clock-wise motion can indicate the reverse. A special control window can be associated with a region on a desk or wall, and controller motion in this window could be interpreted as pen strokes for display elsewhere.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method comprising:
   pointing a handheld controller at a source device to select media data, the handheld controller producing controller position and orientation information sufficient to determine the source device;
   wherein the orientation information includes information from a six- degrees-of-freedom sensor on the handheld controller about the orientation of the controller so that the direction that the handheld controller is pointing can be determined;
   pointing the handheld controller at a sink device to send a paste signal, the handheld controller producing controller position and orientation information sufficient to determine the sink device;
   in response to the selecting and pasting, transferring the media data from the source device to the sink device;
   wherein the information from six-degrees-of-freedom sensor on the handheld controller is used to calculate a ray coincident with the handheld controller; and
   wherein the source and sink devices are associated with respective control windows and the determination of a source or sink device is done by calculating whether the calculated ray would intersect one of the respective control windows.

2. The method of claim 1, wherein the selecting of the media data includes pushing a select button and wherein the pasting includes pushing a paste button.

3. The method of claim 1, further comprising displaying the file at the sink device.

4. The method of claim 1, wherein the handheld controller is a six-degrees-of-freedom controller.

5. The method of claim 1, wherein the handheld controller wirelessly communicates with logic to transfer the media file.

6. The method of claim 1, wherein the source and sink devices are associated with predetermined control windows that help define whether the handhold controller is pointed at the source or sink device.

7. The method of claim 1, wherein the sink device is a media bus to transfer the media data to another location.

8. The method of claim 1, wherein the media data is automatically converted to a format desirable for the sink device.

9. The method of claim 1, wherein user feedback is produced when the select or paste function occurs.

10. A system comprising:
    a handheld controller to produce controller position and orientation information for selecting source and sink devices;
    wherein the orientation information includes information from a six- degrees-of-freedom sensor on the handheld controller about the orientation of the controller so that the direction that the handheld controller is pointing can be determined;
    logic adapted to transfer media data from a selected source device to a selected sink device in response to the selecting of the source and sink device with the handheld computer;
    wherein the information from six-degrees-of-freedom sensor on the handheld controller is used to calculate a ray coincident with the handheld controller; and wherein the source and sink devices are associated with respective control windows and the determination of a source or sink device is done by calculating whether the calculated ray would intersect one of the respective control windows.

11. The system of claim 10, wherein the logic connects to a network that acts as a switching matrix.

12. The system of claim 11, wherein the network is the Internet.

13. The system of claim 10, wherein the handheld controller includes a select button for selecting a source device and a paste button for selecting a sink device.

14. The system of claim 10, wherein the logic includes a switching matrix.

15. The system of claim 10, wherein the logic includes a central controller.

16. The system of claim 10, wherein the logic includes a format converter.

17. The system of claim 10, wherein the handheld controller is a six-degrees-of-freedom controller.

18. The system of claim 10, wherein the handheld controller wirelessly communicates with the logic.

19. The system of claim 10, wherein the source and sink devices are associated with predetermined control windows that help define whether the handhold controller is pointed at the source or sink device.

20. The system of claim 10, wherein the sink device is a media bus connected to another location.

* * * * *

UNITED STATES PATENT AND TRADEMARK OFFICE
CERTIFICATE OF CORRECTION

| | | |
|---|---|---|
| PATENT NO. | : 7,624,166 B2 | Page 1 of 1 |
| APPLICATION NO. | : 10/727310 | |
| DATED | : November 24, 2009 | |
| INVENTOR(S) | : Foote et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1431 days.

Signed and Sealed this

Fifth Day of October, 2010

David J. Kappos
*Director of the United States Patent and Trademark Office*